(12) United States Patent
Krysztal

(10) Patent No.: US 10,028,122 B2
(45) Date of Patent: *Jul. 17, 2018

(54) METHOD AND SYSTEM FOR EMERGENCY SAFETY CHECKS VIA PAYMENT SYSTEMS

(71) Applicant: MASTERCARD INTERNATIONAL INCORPORATED, Purchase, NY (US)

(72) Inventor: Javier Krysztal, Miami, FL (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/789,162

(22) Filed: Oct. 20, 2017

(65) Prior Publication Data

US 2018/0146353 A1    May 24, 2018

Related U.S. Application Data

(63) Continuation of application No. 15/355,898, filed on Nov. 18, 2016, now Pat. No. 9,801,038.

(51) Int. Cl.
*H04M 11/04* (2006.01)
*H04W 4/22* (2009.01)
(Continued)

(52) U.S. Cl.
CPC ........ *H04W 4/90* (2018.02); *G06F 17/30477* (2013.01); *H04L 51/32* (2013.01);
(Continued)

(58) Field of Classification Search
CPC ..... H04W 4/22; H04W 4/14; G06F 17/30477; H04L 67/18; H04L 51/32
See application file for complete search history.

(56) References Cited

U.S. PATENT DOCUMENTS

2007/0169149 A1* 7/2007 Jennings ............... H04N 7/165
725/58
2007/0244811 A1  10/2007 Tumminaro
(Continued)

FOREIGN PATENT DOCUMENTS

JP    2011-154657 A    8/2011

OTHER PUBLICATIONS

Notification of Transmittal of the International Search Report and the Written Opinion of the International Searching Authority (Forms PCT/ISA/220, PCT/ISA/210 and PCT/ISA/237) dated Jan. 10, 2018, by the European Patent Office in corresponding International Application No. PCT/US2017/056014. (12 pages).

*Primary Examiner* — Ajit Patel
(74) *Attorney, Agent, or Firm* — Buchanan Ingersoll & Rooney PC

(57) ABSTRACT

A method for facilitating a safety check in emergency situations includes: storing a plurality of account profiles, each including a primary account number, account details, and sets of communication data; receiving a transaction message including a specific primary account number and an indication that an associated individual is safe; identifying a specific account profile that includes the specific primary account number; and transmitting a safety notification including the account details stored in the specific account profile the indication of the associated individual's safety for at least one of the sets of communication data stored in the specific account profile.

20 Claims, 8 Drawing Sheets

(51) Int. Cl.
    *G06F 17/30*     (2006.01)
    *H04W 4/14*     (2009.01)
    *H04L 12/58*     (2006.01)
    *H04L 29/08*     (2006.01)
    *H04W 4/90*     (2018.01)

(52) U.S. Cl.
    CPC ............... *H04L 67/18* (2013.01); *H04W 4/14* (2013.01); *H04W 4/22* (2013.01)

(56) References Cited

U.S. PATENT DOCUMENTS

| | | | |
|---|---|---|---|
| 2009/0037547 A1 | 2/2009 | Endo et al. | |
| 2011/0242967 A1* | 10/2011 | Starr | G06F 9/44505 370/221 |
| 2015/0227902 A1 | 8/2015 | Bertanzetti et al. | |

* cited by examiner

METHOD AND SYSTEM FOR EMERGENCY SAFETY CHECKS VIA PAYMENT SYSTEMS

FIELD

The present disclosure relates to the facilitation of safety checks in emergency situations, specifically the ability for an individual to convey that they are safe during an emergency situation via the use of systems that are still operable in instances where cellular communication systems and Internet connections may be unavailable via the use of payment systems.

BACKGROUND

When an emergency situation strikes an area, friends and family of individuals that are in the area often become concerned about the individual. Ideally, the individual would be able to call their friends or family to notify them if the individual is safe. However, because of the need to coordinate emergency services, individuals are often requested to refrain from making calls, in order to reserve available telephone bandwidth for the emergency services. Also, telephone and text service providers may prioritize or provide only limited access to their services.

In an effort to assist individuals with conveying their status without using telephone lines, some services have been developed that enable an individual to convey their status via the Internet, which is often accessible via the cellular communication network of an individual's mobile communication device. For instance, Facebook® operates a service during emergency situations that enables an individual to indicate that they are safe, which notifies each of the individual's followers of their status. In such cases, an individual can quickly convey that they are safe to a vast number of friends and family, without tying up a telephone line.

However, such systems still rely on Internet and/or cellular communication services. In many situations, the bandwidth of a cellular communication network or Internet connection may be exceeded due to the vast number of individuals seeking to use the service at once. Furthermore, there may be cases where such communication methods may be unavailable, such as due to the emergency situation. For example, a loss of power may prevent usage of a cellular communication or Internet access point. In such cases, there are currently no systems available for conveying an individual's status, to ensure their safety to their friends and family.

Thus, there is a need for a technical solution whereby an individual's safety status during an emergency situation may be conveyed to others that does not rely on the Internet or cellular communication networks.

SUMMARY

The present disclosure provides a description of systems and methods for the facilitation of safety checks in emergency situations via the use of payment systems. Payment systems operate using different, specialized communication infrastructure from cellular communication networks and the Internet, referred to herein as "payment rails," defined in more detail below. The payment rails provide for an alternative avenue of communication that may enable an individual to convey their status, even in instances where an Internet or cellular communication network connection may be unavailable. In addition, the use of payment systems for conveying status may further preserve the resources of cellular communication networks for emergency service responders and providers. As a result, the use of the payment rails may provide for higher reliability in conveying individual safety information, and may also facilitate faster and more efficient responses in emergency situations.

A method for facilitating a safety check in emergency situations includes: storing, in an account database of a processing server, a plurality of account profiles, wherein each account profile includes a structured data set related to a transaction account including at least a primary account number, account details, and one or more sets of communication data; receiving, by a receiving device of the processing server, a transaction message, wherein the transaction message is formatted based on one or more standards, includes a plurality of data elements including at least a first data element configured to store a specific primary account number, and includes an indication that an associated individual is safe; executing, by a querying module of the processing server, a query on the account database to identify a specific account profile where the included primary account number corresponds to the specific primary account number; and electronically transmitting, by a transmitting device of the processing server, a notification including at least the account details stored in the identified specific account profile and indicating safety of the associated individual for at least one of the one or more sets of communication data stored in the identified specific account profile.

A system for facilitating a safety check in emergency situations includes: an account database of a processing server configured to store a plurality of account profiles, wherein each account profile includes a structured data set related to a transaction account including at least a primary account number, account details, and one or more sets of communication data; a receiving device of the processing server configured to receive a transaction message, wherein the transaction message is formatted based on one or more standards, includes a plurality of data elements including at least a first data element configured to store a specific primary account number, and includes an indication that an associated individual is safe; a querying module of the processing server configured to execute a query on the account database to identify a specific account profile where the included primary account number corresponds to the specific primary account number; and a transmitting device of the processing server configured to electronically transmit a notification including at least the account details stored in the identified specific account profile and indicating safety of the associated individual for at least one of the one or more sets of communication data stored in the identified specific account profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
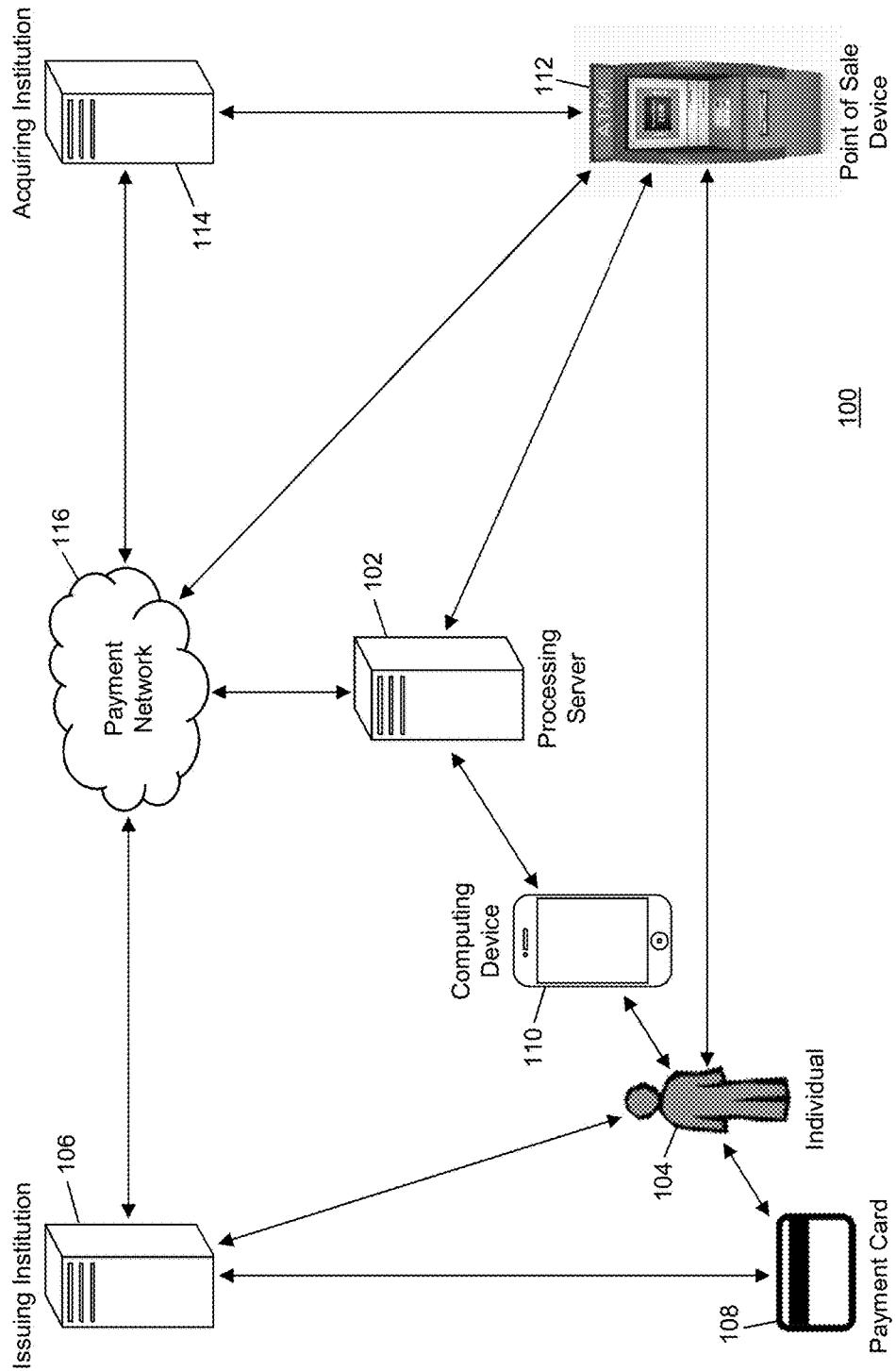
FIG. 1 is a block diagram illustrating a high level system architecture for facilitating safety checks in emergency situations via payment systems in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Emergency Safety Checks Via Payment Systems

FIG. 1 illustrates a system 100 for the conducting of safety checks in emergency situations to indicate an individual's safety via the use of payment systems.

The system 100 may include a processing server 102. The processing server 102, discussed in more detail below, may be configured to facilitate emergency safety checks for an individual 104 during an emergency situation via payment networks as an alternative to the use of cellular communication networks and the Internet. In the system 100, the individual 104 may have a transaction account issued thereto by an issuing institution 106. The issuing institution 106 may be any type of institution, such as a financial institution (e.g., an issuing bank), configured to issue transaction accounts to consumers for use in funding electronic payment transactions. As part of the issuing of the transaction account to the individual 104, the issuing institution 106 may issue a payment card 108 or other suitable type of payment instrument to the individual 104, which may be encoded with account details for the transaction account, to be conveyed as part of a payment transaction. For instance, the payment card 108 may be a credit card where the account details are stored in an integrated circuit therein or encoded in a magnetic strip thereof.

The individual 104 may receive the payment card 108 and may register their transaction account with the processing server 102 for use thereof in conveying safety during an emergency situation. In one embodiment, the individual 104 may manually register their transaction account with the processing server 102, such as via the use of a computing device 110. The computing device 110 may be any type of computing device suitable for performing the functions discussed herein, such as a desktop computer, laptop computer, notebook computer, tablet computer, cellular phone, smart phone, smart television, smart watch, wearable computing device, implantable computing device, etc. The individual 104 may register their transaction account via an application program executed by the computing device 110, such as an application program directly associated with the processing server 102 or a web browsing application program navigated to a web page associated with the processing server 102. In some embodiments, the issuing institution 106 may register the transaction account with the processing server 102 (e.g., upon issuance), where the individual 104 may contact the processing server 102 with the computing device 110 to modify account settings.

As part of the registration of the transaction account and/or modification of account settings, the individual 104 may provide sets of communication data for each entity to be notified of the individual's safety during an emergency situation. Each set of communication data may be associated with an entity (e.g., an individual, business, social network, etc.) and include at least communication information for communicating with the entity. For instance, a set of communication data may be a telephone number to which a short message service (SMS) message is to be sent, an e-mail address to which an e-mail is to be sent, a social network address and account identifier on which a notification would be posted, etc. In some cases, an individual 104 may have multiple types of communication data sets registered. For instance, an individual 104 may register sets of communication data for sending SMS messages to immediate family members, as well as a set of communication data for their account on a social network for posting of a notification thereto to notify other family, friends, and acquaintances.

In some embodiments, the processing server 102 may be configured to enable the individual 104 to provide different levels of notification for their sets of communication data. For instance, the individual 104 may identify sets of communication data that are to be provided with their geographic location when being notified of the individual's safety, as well as other sets of communication data that are not to be provided with anything beyond the indication that the individual 104 is safe. For example, the individual 104 may want to notify their immediate family of exactly where they are when performing a safety check, but may not want to provide that information to extended family or friends. In some instances, the processing server 102 may provide the individual 104 with the opportunity to make such selections during the safety check process, as discussed below.

When an emergency situation occurs, the individual 104 may go to a point of sale device 112 for use thereof in performing a safety check. In some embodiments, the individual 104 may be notified of an emergency situation by the processing server 102, for which a safety check may be desirable. For example, the individual 104 may register their geographic location as part of the registration process. The processing server 102 may be notified of an emergency situation in a geographic area (e.g., by user input, receipt of a notification from a third party data source, etc.) and may electronically transmit a notification to the individual 104 via their computing device 110 if the individual's geographic location is inside of the geographic area in which the emergency situation is occurring. For instance, the processing server 102 may electronically transmit an SMS message, e-mail, notification via an application program, etc. to the individual's computing device 110.

At the point of sale device 112, the individual 104 may present their payment card 108 or other payment instrument for conveyance of the account details to the point of sale device 112. For instance, the payment card 108 may be inserted into the point of sale device 112 for the reading of account details stored or encoded therein, the payment card 108 may be placed in proximity of the point of sale device 112 for conveyance of account details thereto via near field communication, the payment card 108 may display a machine-readable code that is encoded with the account details for reading by the point of sale device 112, etc. The point of sale device 112 may receive the account details from the payment card 108, which may include at least a primary account number associated with the transaction account.

The point of sale device 112 may be configured to provide the individual 104 with the ability to indicate that a safety check is to be performed. In one embodiment, the point of sale device 112 may provide an option for selection by the individual 104 to indicate that a safety check is desired. In another embodiment, the individual 104 may select a specific merchant for involvement in a payment transaction, where the specific merchant is used for safety checks. In yet another embodiment, the individual may select a predetermined transaction amount (e.g., $0.12) that is indicative of a safety check. In such an embodiment, the predetermined transaction amount may be set by the processing server 102 and/or individual 104, such as during the registration process for the transaction account. For example, the individual 104 may set a predetermined transaction amount of $0.03, and may initiate a withdrawal of $0.03 at an automated teller machine (ATM), which may initiate the safety check process. In some cases, the point of sale device 112 may provide the individual 104 with selection options for customization of their safety check, such as by selecting sets of communication data for notifying, inclusion of the geographic location of the point of sale device 112 or other data in the notifications, etc.

Once the individual 104 has provided their account details and indication of safety to the point of sale device 112, the point of sale device 112 may electronically transmit the data to the processing server 102. In one embodiment, the point of sale device 112 may generate a transaction message that is directly submitted to the processing server 102 via payment rails. In another embodiment, the point of sale device 112 may electronically transmit transaction data for an electronic payment transaction that includes the account details and safety check data to an acquiring institution 114 associated therewith, which may then generate and submit a transaction message directly to the processing server 102 via payment rails or to a payment network 116 via payment rails associated therewith, which may in turn forward the transaction message to the processing server 102. The acquiring institution 114 may be a suitable type of entity, such as a financial institution (e.g., an acquiring bank), configured to issue transaction accounts to point of sale devices 112 or entities associated therewith for use in the receipt of funds as part of electronic payment transactions. The payment network 116 may be configured to process electronic payment transactions and operate payment rails associated therewith for the conveyance of transaction messages. In some embodiments, the processing server 102 may be a part of the payment network 116 and may receive transaction messages therefrom via internal communication methods.

Transaction messages may be specially formatted data messages that are formatted pursuant to one or more standards governing the exchange of financial transaction messages, such as the International Organization of Standardization's ISO 8583 or ISO 20022 standards. A transaction message may include at least a message type indicator that is indicative of a type of transaction message (e.g., authorization request, authorization response, account inquiry, etc.) and a plurality of data elements configured to store transaction data. Transaction data may include, for example, a transaction amount, transaction time, transaction date, geographic location, currency type, point of sale device type, merchant data, consumer data, account data, product data, offer data, loyalty data, etc. In some embodiments, a transaction message may also include one or more bitmaps, which may indicate the data elements included in the transaction message and the data stored therein. Additional information regarding transaction messages and use thereof in the processing of payment transactions is discussed below with respect to the process 600 illustrated in FIG. 6.

In one embodiment, the transaction message submitted to the processing server 102 may include a message type indicator that is indicative of a safety check. In such an embodiment, the payment network 116 may forward transaction messages to the processing server 102 based on the message type indicator. In another embodiment, the transaction amount stored in the corresponding data element may be the predetermined transaction amount indicative of a safety check, e.g., an amount that would not be normal to a transaction, such as impossibly high amounts (e.g., $100,001.00) or unusually low amounts, e.g., 11 cents for one type of message to just family, 12 cents for friends and family and including geographic location, etc., wherein different amounts indicate different communication parameters (e.g., people or grouped to be contacted, message content, status of the cardholder, ETA at a safe destination, etc.). The unusual amount would be detected at the processing server 102, the POS location checked perhaps to determine if the POS is located at a location under an emergency, and if both are true, then a message can be transmitted to the designated people with the selected message content. In yet another embodiment, the plurality of data elements may include a data element reserved for private use as set forth in the associated standard(s), which may be used to store an indication that a safety check is being performed. In cases where the individual 104 may be provided with additional selection options by the point of sale device 112, such as the selection of whether or not to share their geographic location, which sets of communication data should be notified, etc., such data may be stored in one or more data elements included in the transaction message that are reserved for private use.

The processing server 102 may receive the transaction message and may initiate the electronic transmission of notifications to indicate the individual's safety. The processing server 102 may identify an account profile associated with the individual's registered transaction account, discussed in more detail below, and may then electronically transmit a notification for each set of communication data (e.g., as indicated in the transaction message, if applicable), where the notification indicates the individual's safety. In some cases, the account profile may include account details, which may be included in the notification, such as the individual's name, a social network identifier, the individual's contact information (e.g., e-mail address, telephone number, etc.), a customized message set by the individual 104, etc. In some cases, the notification may also include data related to the emergency situation, such as a name of the situation, geographic area of the situation, nature of the situation, etc. For instance, the notification may indicate that the individual 104 is safe following an earthquake in a specific city, or may include information with how the entity can be of assistance (e.g., emergency services numbers, aid organization information, donation links, etc.). Each of the associated entities may then receive the notification, which may indicate to each entity that the individual 104 is safe during the emergency situation.

The methods and systems discussed herein provide for the ability for an individual 104 to perform a safety check during an emergency situation to indicate their safety to specific entities that utilizes payment rails rather than the Internet or cellular communication data. The use of a transaction account and established payment rails provides for an alternative avenue of communication that may be available in many instances where cellular communication or Internet, or even power, may be unavailable. As a result, the methods discussed herein provide another avenue of communication to convey the safety of individuals, which may not only facilitate the ability for individuals to report their safety to friends and family, but also free up resources in cellular communication networks for use by emergency services providers, to increase the ability for aid to be extended during the emergency situation.

Processing Server

Figure 2:
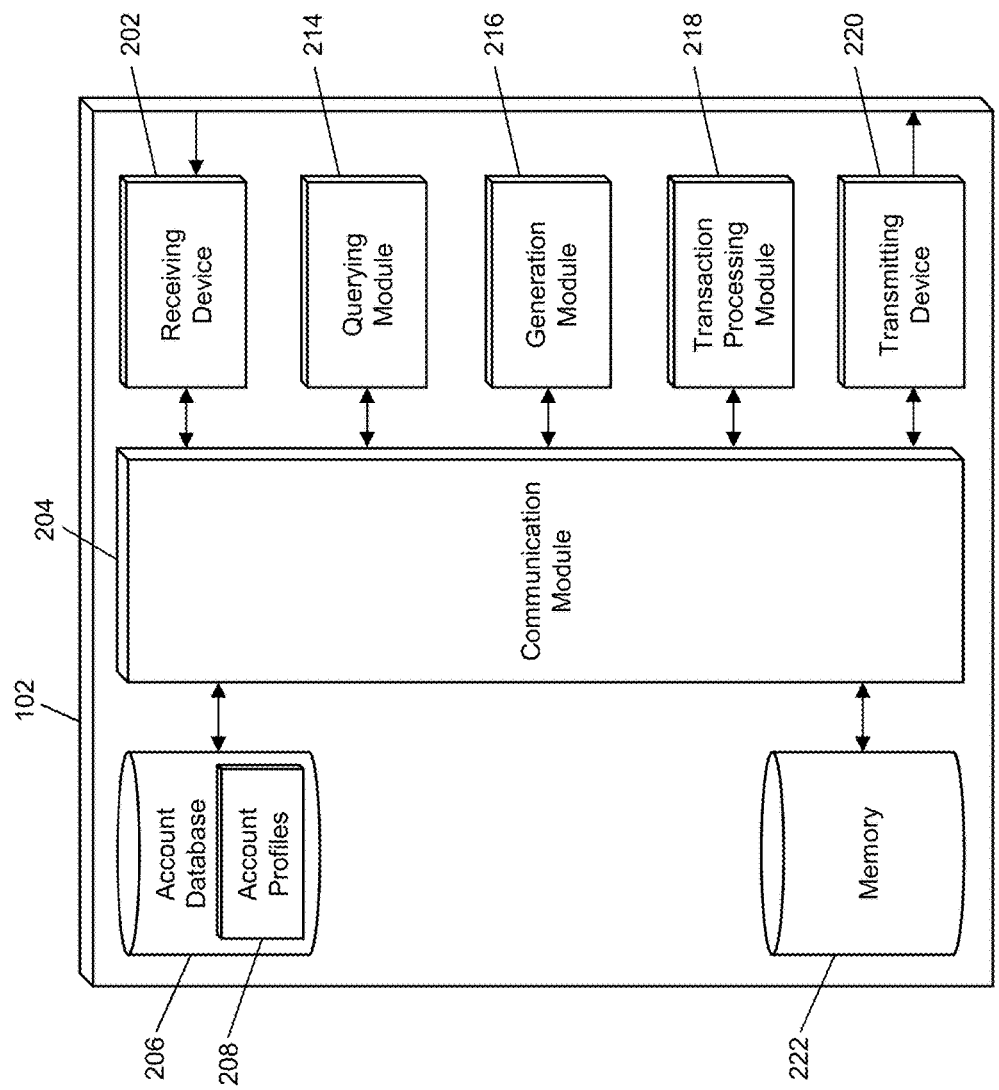
FIG. 2 is a block diagram illustrating the processing server of FIG. 1 for the facilitation of safety checks in emergency situations in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data from issuing institutions 106, computing devices 110, point of sale devices 112, acquiring institutions 114, payment networks 116, and other entities via one or more communication networks, such as local area networks, cellular communication networks, the Internet, etc. The receiving device 202 may also be configured to receive data over specially configured payment rails associated with the payment network 116, which may be specialized infrastructure associated therewith. In some embodiments, the receiving device 202 may be comprised of multiple devices, such as different receiving devices for receiving data over different networks, such as a first receiving device for receiving data via the payment network 116 and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106 and/or computing devices 110, which may be superimposed or otherwise encoded with registration data, which may include at least a primary account number and other account details associated with a transaction account, and may also include additional account settings, such as sets of communication data. The receiving device 202 may also be configured to receive data signals that are superimposed or otherwise encoded with transaction messages, which may be electronically transmitted via payment rails by point of sale devices 112, acquiring institutions 114, and/or payment networks 116. The receiving device 202 may also be configured to receive data signals superimposed with emergency situation data, such as geographic areas and other information associated with an emergency situation for which a safety check may be performed.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilizes various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, transaction processing module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. An account profile 208 may include at least a primary account number, account details, and one or more sets of communication data. In some cases, the primary account number may be accompanied by additional data used to identify authorized usage of the related transaction account, such as transaction counters, payment cryptograms, etc. The account details may include data that may be conveyed with safety notifications, such as a name, contact information, etc. The one or more sets of communication data may each include a communication address and type for the conveyance of a safety notification thereto. In some cases, sets of communication data may include a group identifier, where groups may be associated with notification settings, or each set of communication data may include notification settings. Notification settings may include, for instance, settings regarding the detail provided in safety notifications (e.g., if the geographic location of the point of sale device 112 used is to be provided), message priority (e.g., for sending ahead of other safety notifications, such as in instances where network traffic may be high).

The processing server 102 may include a querying module 214. The querying module 214 may be configured to execute queries on databases to identify information. The querying module 214 may receive one or more data values or query strings, and may execute a query string based thereon on an indicated database, such as the account database 206, to identify information stored therein. The querying module 214 may then output the identified information to an appropriate engine or module of the processing server 102 as necessary. The querying module 214 may, for example, execute a query on the account database 206 to identify an account profile 208 related to a transaction account for which a transaction message is received, based on the primary account number stored in a corresponding data element in the transaction message, and to identify sets of communication data stored therein.

The processing server 102 may also include a generation module 216. The generation module 216 may be configured to generate data for the processing server 102 for performing of the functions associated therewith as discussed herein. The generation module 216 may receive instructions for data to be generated as input, which may be accompanied with data to be used in the generation, may generate the requested data, and may output the generated data to another module or engine of the processing server 102. For example, the generation module 216 may be configured to generate safety notifications for electronic transmission to entities, which may include account details for an account profile 208 and other data as instructed, such as emergency situation information, geographic location information, etc.

The processing server 102 may also include a transaction processing module 218. The transaction processing module 218 may be configured to perform the functions of the processing server 102 related to the processing of payment transactions as discussed herein, such as the receipt and parsing of data stored in the data elements included in a transaction message received by the receiving device 202. In embodiments where the processing server 102 may be a part of the payment network 116, the processing server 102 may be configured to perform traditional functions related to the processing of payment transactions, such as fraud scoring, account mapping, stand-in processing, etc.

The processing server 102 may also include a transmitting device 220. The transmitting device 220 may be configured to transmit data over one or more networks via one or more network protocols. In some embodiments, the transmitting device 220 may be configured to transmit data to computing devices 110, other computing devices, and other entities via one or more networks, such as local area networks, cellular communication networks, the Internet, payment rails, etc. The transmitting device 220 may also be configured to transmit data over specially configured payment rails associated with the payment network 116, which may be specialized infrastructure associated therewith. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to computing devices 110, which may be superimposed or otherwise encoded with emergency situation information, such as to notify an individual 104 that they are in a geographic area associated with an emergency situation for which a safety check may be performed. The transmitting device 220 may also be configured to electronically transmit data signals superimposed or otherwise encoded with safety notifications. Safety notifications may be generated by the generation module 216 include account details identified in an account profile 208 (e.g., by the querying module 214) and may indicate the safety of an associated individual 104, and may also include additional data, such as indicated in settings in the account profile 208. Safety notifications may be in any suitable format (e.g., SMS message, e-mail message, social network posting, etc.) and may be electronically transmitted using any suitable communication method (e.g., cellular communication, radio frequency, the Internet, etc.) and to any suitable type of computing device (e.g., desktop computer, laptop computer, notebook computer, tablet computer, cellular phone, smart phone, smart television, smart watch, wearable computing device, implantable computing device, etc.).

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Process for Performing an Emergency Safety Check Via Payment Systems

Figure 3A:
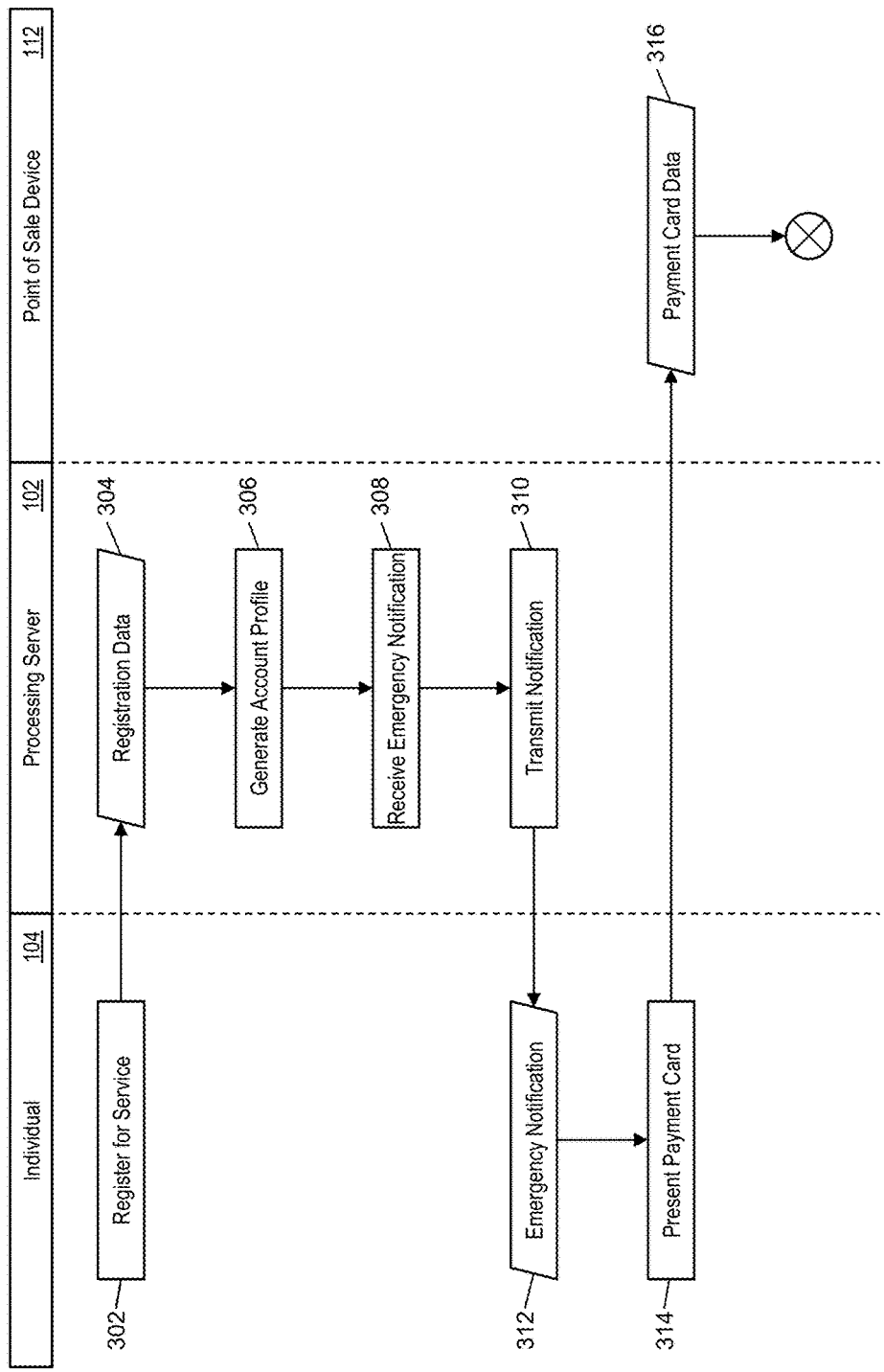
FIGS. 3A and 3B are a flow diagram illustrating a process for conveying an individual's safety during an emergency situation using a payment network in the system of FIG. 1 in accordance with exemplary embodiments.
Figure 3B:
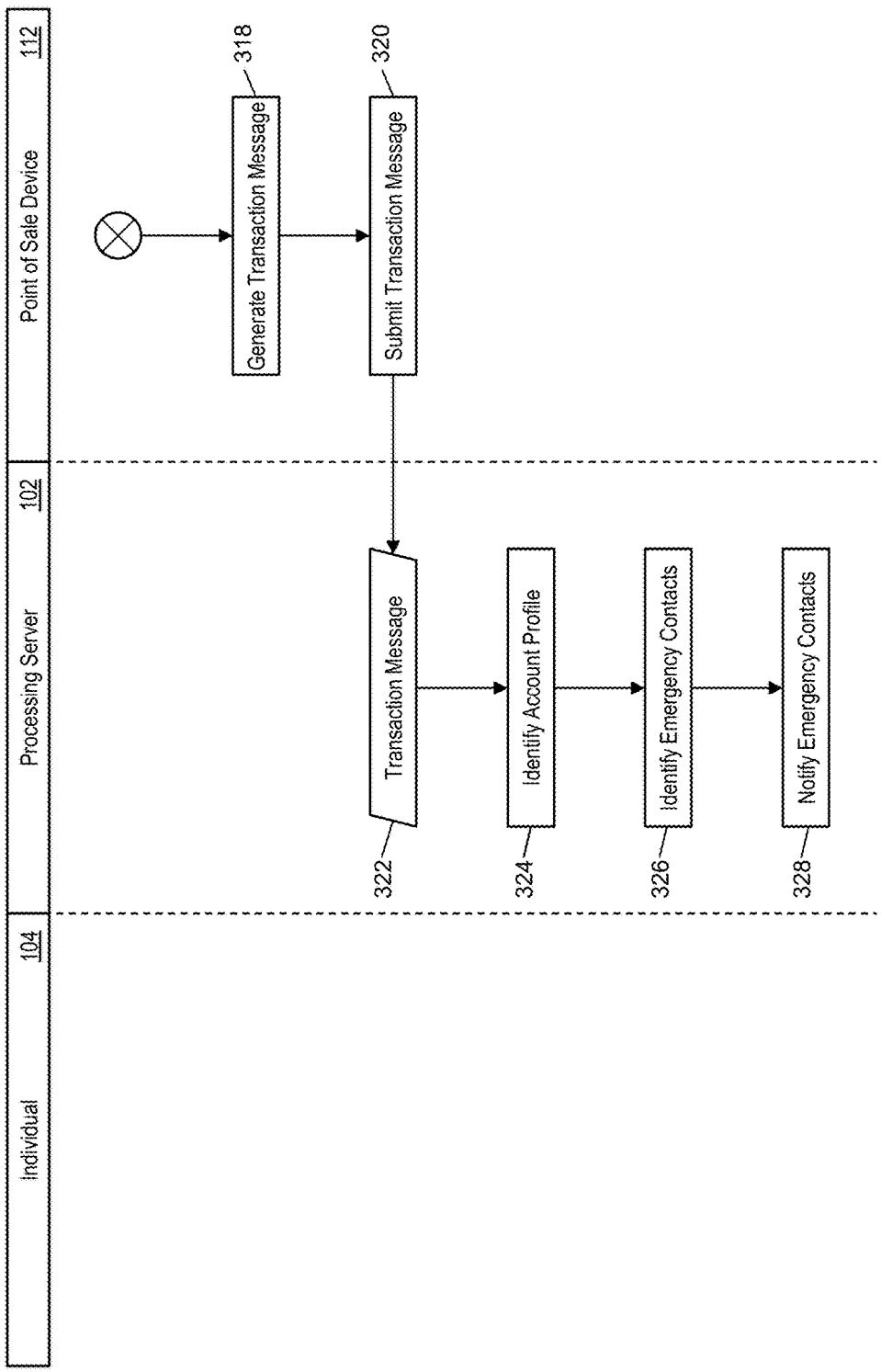

FIGS. 3A and 3B illustrate a process for the performing of an emergency safety check in the system 100 accomplished via the use of payment systems.

In step 302, the individual 104 may register their transaction account with the processing server 102 for use in performing safety checks in emergency situations using the payment rails associated with a payment network 116. As part of the registration, the individual 104 may use a computing device 110 to electronically transmit at least a primary account number, account details, and one or more sets of communication data to the processing server 102. In some embodiments, the registration data may also include authentication data for use by the processing server 102 in authenticating the individual 104 as an authorized user for the transaction account being registered, and may also include data associated with the computing device 110 (e.g., a device identifier, network address, etc.), as well as a geographic location associated with the individual 104. In step 304, the receiving device 202 of the processing server 102 may receive the registration data from the individual 104. In some embodiments, step 304 may include authentication of the received registration data, such as via communication with the issuing institution 106 to authenticate the individual 104 as an authorized user of the transaction account being registered.

In step 306, the querying module 214 of the processing server 102 may execute a query on the account database 206 of the processing server 102 to generate a new account profile 208 that is related to the transaction account being registered, where the account profile 208 includes the supplied primary account number, account details, and sets of communication data. In step 308, the receiving device 202 of the processing server 102 may receive an emergency notification, which may notify the processing server 102 that an emergency situation is occurring in a specific geographic area. In step 310, the transmitting device 220 of the processing server 102 may electronically transmit the emergency notification or data included therein to a computing device 110 associated with the individual 104 (e.g., as registered during the registration process) to inform the individual 104 that a safety check may be performed. In instances where the individual 104 registered their geographic location, the notification may only be transmitted to the individual 104 in instances where the registered geographic location is inside of the geographic area associated with the emergency situation.

In step 312, the individual 104 may receive (e.g., via their computing device 110) the notification of the emergency situation. In step 314, the individual 104 may go to a point of sale device 112 and present their payment card 108 associated with the registered transaction account for the performing of a safety check. In some embodiments, step 314 may include the selection of options on the point of sale device 112 to indicate that a safety check is being performed and that the individual 104 is safe. For instance, options may include the selection of sets of communication data that are to be used for safety notifications, if the geographic location of the point of sale device 112 is to be included, etc. In step 316, the point of sale device 112 may read the payment card data, including at least the primary account number associated therewith, the indication that the individual 104 is safe, and any other selection options.

In step 318, the point of sale device 112 (e.g., or acquiring institution 114 associated with the point of sale device 112) may generate a transaction message for an electronic payment transaction related to the safety check, which may be submitted to the processing server 102 (e.g., via payment rails associated with the payment network 116). The transaction message may be formatted pursuant to one or more standards, such as the ISO 8583 or 20022 standards, and may include at least a message type indicator and a plurality of data elements, including at least a first data element configured to store the primary account number. The transaction message may also include the indication that the individual 104 associated with the transaction account corresponding to the primary account number is safe, which may be indicated by the message type indicator, a predetermined transaction amount stored in a corresponding data element, or an indication stored in a data element reserved for private use. In step 320, the point of sale device 112 may electronically transmit the transaction message to the processing server 102.

In step 322, the receiving device 202 of the processing server 102 may receive the transaction message (e.g., via the payment network 116, if applicable) through the payment rails. In step 324, the querying module 214 of the processing server 102 may execute a query on the account database 206 to identify the account profile 208 related to the individual's transaction account via the primary account number stored in the corresponding data element included in the transaction message. In step 326, the querying module 214 may identify the sets of communication data to which safety notifications are to be transmitted, which may, in some instances, be subject to options indicated by the individual 104 (e.g., in step 314), as may be stored in a data element included in the transaction message reserved for private use. In step 328, the generation module 216 of the processing server 102 may generate safety notifications for each identified emergency contact, which may include at least an indication that the individual 104 is safe, which may be electronically transmitted, by the transmitting device 220 of the processing server 102, thereto based on communication details included in the corresponding set of communication data.

Safety Notifications

Figure 4B:
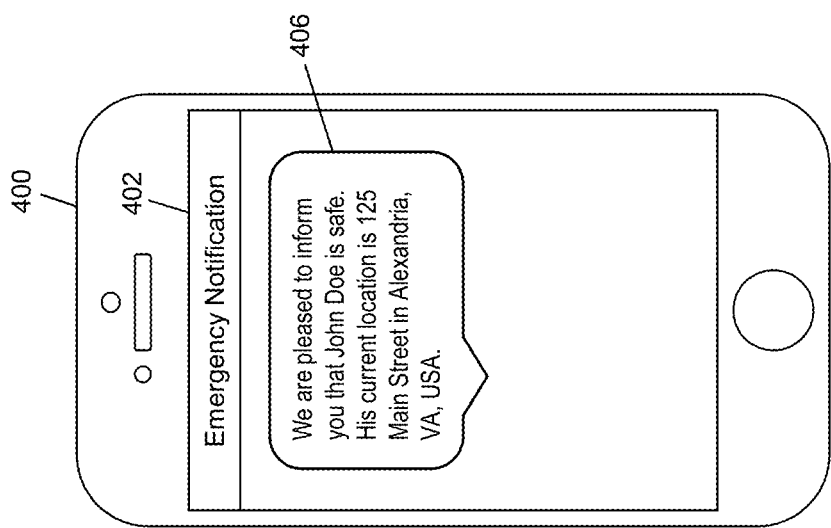
FIGS. 4A and 4B are a graphic user interface illustrating the receipt of messages conveying individual safety during an emergency situation in accordance with exemplary embodiments.
Figure 4A:
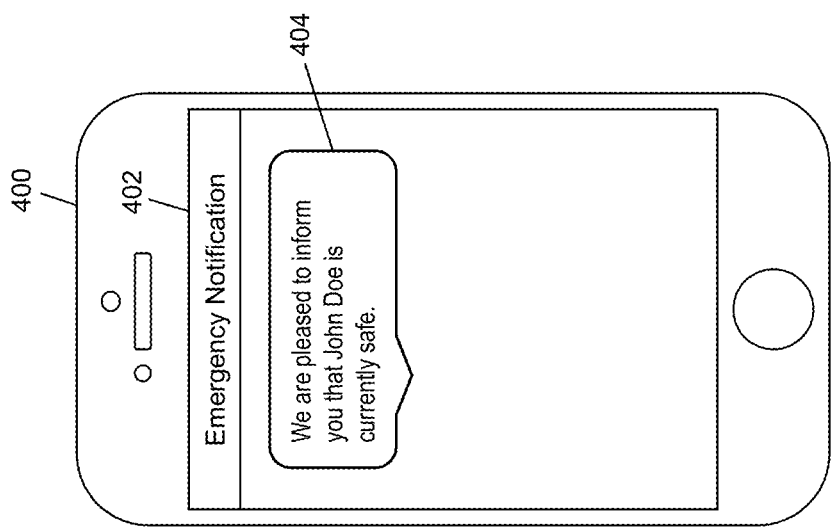

FIGS. 4A and 4B illustrate example safety notifications that may be electronically transmitted to computing devices following the performing of a safety check by an individual 104 as discussed herein.

An entity to which a safety notification is to be transmitted may possess a computing device 400. The computing device 400 may have a device identifier or other value associated therewith that may be used for identification thereof in the electronic transmission of data signals thereto by the processing server 102. For instance, in the examples illustrated in FIGS. 4A and 4B, the computing device 400 may have a telephone number or e-mail address associated therewith to which the safety notification may be transmitted.

The computing device 400 may include a display device 402. The display device 402 may be any suitable type of display, such as a liquid crystal display, light-emitting diode display, thin film transistor display, capacitive touch display, etc. In the example illustrated in FIG. 4A, the computing device 400 may receive a short message service (SMS) message 404, which may be displayed to a user thereof via the display device 402. In the example in FIG. 4A, the SMS message 400 indicates that the individual 104 ("John Doe") is safe. In the example illustrated in FIG. 4B, the computing device 400 may receive an SMS message 406 that indicates that the individual 104 is safe, and also indicates the geographic location of the individual 104 at the time the safety check was performed (e.g., as submitted in the transaction message by the point of sale device 112). In such an example, the SMS message 404 may be electronically transmitted to a first group of entities and the SMS message 406 may be electronically transmitted to a second group of entities, which may be indicated in the account settings for the individual's account profile 208, or may be selected by the individual 104 while performing the safety check at the point of sale device 112. For instance, the individual 104 may want to share their geographic location with immediate family and/or others who may be able to assist the individual 104, but may not want to report their location to other entities while still conveying that they are safe.

Exemplary Method for Facilitating a Safety Check in Emergency Situations

Figure 5:
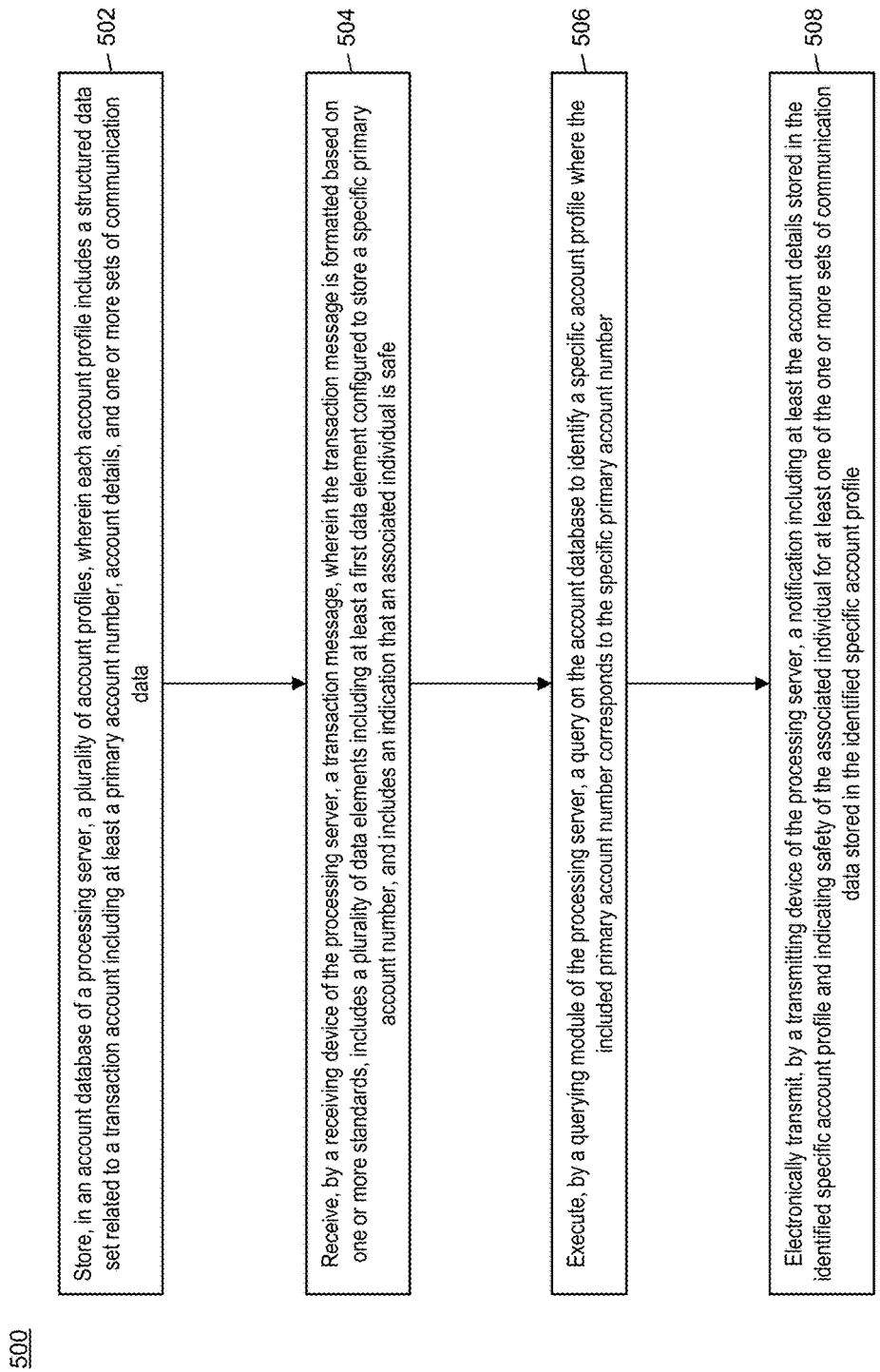
FIG. 5 is a flow chart illustrating an exemplary method for facilitating a safety check in emergency situations in accordance with exemplary embodiments.

FIG. 5 illustrates a method 500 for the facilitation of a safety check in emergency situations via the use of a payment network for conveyance of an indication of an individual's safety.

In step 502, a plurality of account profiles (e.g., account profiles 208) may be stored in an account database (e.g., the account database 206) of a processing server (e.g., the processing server 102), wherein each account profile includes a structured data set related to a transaction account including at least a primary account number, account details, and one or more sets of communication data. In step 504, a transaction message may be received by a receiving device (e.g., the receiving device 202) of the processing server, wherein the transaction message is formatted based on one or more standards, includes a plurality of data elements including at least a first data element configured to store a specific primary account number, and includes an indication that an associated individual (e.g., the individual 104) is safe.

In step 506, a query may be executed on the account database by a querying module (e.g., the querying module 214) of the processing server to identify a specific account profile where the included primary account number corresponds to the specific primary account number. In step 508, a notification that includes at least the account details stored in the identified specification account profile and indicates safety of the associated individual may be electronically transmitted by a transmitting device (e.g., the transmitting device 220) of the processing server for at least one of the one or more sets of communication data stored in the identified specific account profile.

In one embodiment, the indication that the associated individual is safe may be a message type indicator included in the transaction message indicative of a safety check. In another embodiment, the indication that the associated individual is safe may be stored in a second data element included in the transaction message configured for private use. In yet another embodiment, the indication that the associated individual is safe may be indicated via storage of a predetermined transaction amount in a second data element included in the transaction message. In some embodiments, the notification may be electronically transmitted to a social network and the account details comprise at least an account identifier associated with the social network. In one embodiment, the at least one of the one or more sets of communication data may include a telephone number, and the notification may be included in a short messaging service message electronically transmitted to the telephone number.

In some embodiments, the method 500 may further include: receiving, by the receiving device of the processing server, a notification of an emergency condition; and electronically transmitting, by the transmitting device of the processing server, a subsequent notification of the emergency condition to a computing device (e.g., the computing device 110) associated with the identified specific account profile. In a further embodiment, the subsequent notification may be electronically transmitted to the computing device prior to receipt of the transaction message. In another further embodiment, the notification of the emergency condition may include at least an associated geographic area, the specific account profile may further include an associated geographic location, and the associated geographic location may be included in the associated geographic area. In yet another further embodiment, the specific account profile may further include communication information, and the subsequent notification may be electronically transmitted to the computing device based on the communication information.

Payment Transaction Processing System and Process

Figure 6:
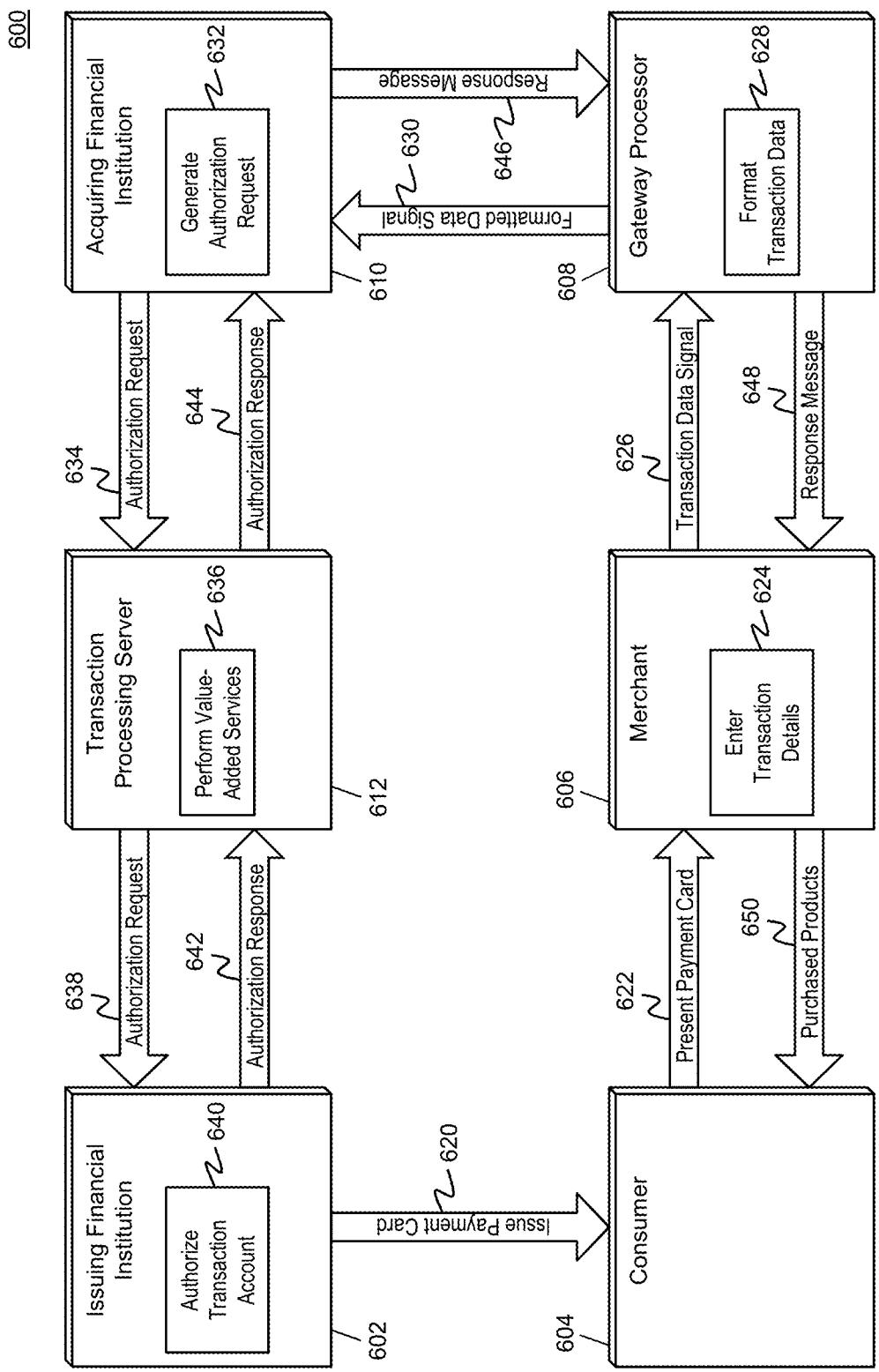
FIG. 6 is a flow diagram illustrating the processing of a payment transaction in accordance with exemplary embodiments.

FIG. 6 illustrates a transaction processing system and a process 600 for the processing of payment transactions in the system, which may include the processing of thousands, millions, or even billions of transactions during a given period (e.g., hourly, daily, weekly, etc.). The process 600 and steps included therein may be performed by one or more components of the system 100 discussed above, such as the processing server 102, individual 104, issuing institution 106, payment card 108, point of sale device 112, acquiring institution 114, payment network 116, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3A, 3B, and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8583 or 20022 standards. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8583 or 20022 standards and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 650, assuming the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 612. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
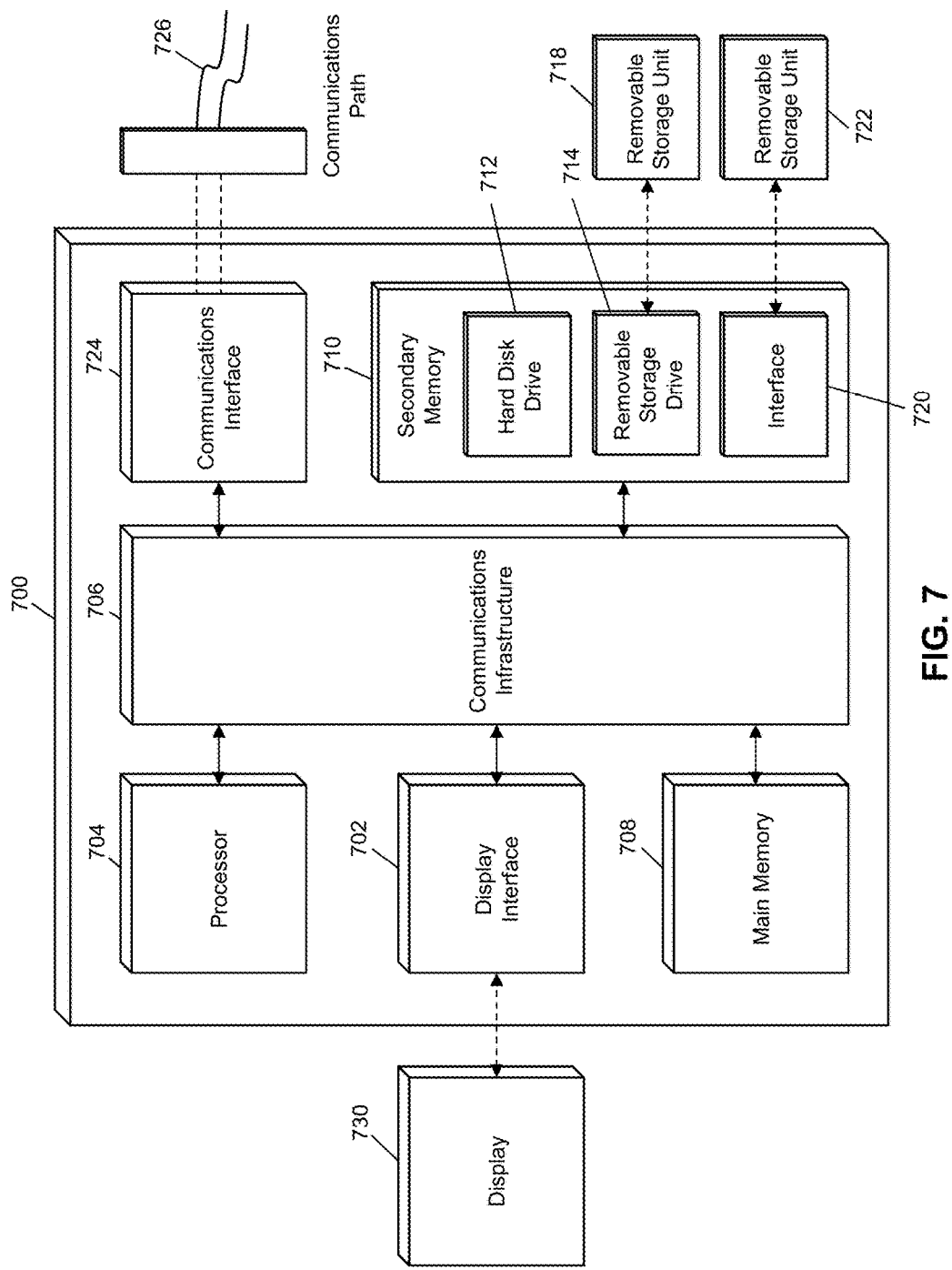
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of FIGS. 3A, 3B, 5, and 6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, 5, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for facilitating safety checks in emergency situations. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating a safety check in emergency situations using a payment rail associated with a payment network, comprising:
   storing, in an account database of a processing server, a plurality of account profiles, wherein each account profile includes a structured data set related to a transaction account including at least a primary account number, account details, and one or more sets of communication data;
   receiving, by a receiving device of the processing server, a transaction message through the payment rail, wherein the transaction message is formatted based on one or more standards, includes an indication that an associated individual is safe, and includes a plurality of data elements including at least a first data element configured to store a specific primary account number;
   executing, by a querying module of the processing server, a query on the account database to identify a specific account profile where the included primary account number corresponds to the specific primary account number stored in the corresponding data element included in the transaction message; and
   electronically transmitting, by a transmitting device of the processing server, a notification including at least the account details stored in the identified specific account profile and indicating safety of the associated individual for at least one of the one or more sets of communication data stored in the identified specific account profile, wherein the notification is electronically transmitted via a digital communication service.

2. The method of claim 1, wherein the indication that the associated individual is safe is a message type indicator included in the transaction message indicative of a safety check.

3. The method of claim 1, wherein the indication that the associated individual is safe is stored in a second data element included in the transaction message configured for private use.

4. The method of claim 1, wherein the indication that the associated individual is safe is indicated via storage of a predetermined transaction amount in a second data element included in the transaction message.

5. The method of claim 1, wherein the digital communication service is a social network and the account details comprise at least an account identifier associated with the social network.

6. The method of claim 1, wherein
   the at least one of the one or more sets of communication data includes a telephone number, and
   the notification is included in a short messaging service message electronically transmitted to the telephone number using a short messaging service as the digital communication service.

7. The method of claim 1, further comprising:
   receiving, by the receiving device of the processing server, a notification of an emergency condition; and
   electronically transmitting, by the transmitting device of the processing server, a subsequent notification of the emergency condition to a computing device associated with the identified specific account profile.

8. The method of claim 7, wherein the subsequent notification is electronically transmitted to the computing device prior to receipt of the transaction message.

9. The method of claim 7, wherein
   the notification of the emergency condition includes at least an associated geographic area,
   the specific account profile further includes an associated geographic location, and
   the associated geographic location is included in the associated geographic area.

10. The method of claim 7, further comprising:
    electronically transmitting, by the transmitting device of the processing server, a second notification indicating safety of the associated individual for at least a second of the one or more sets of communication data using a second digital communication service, wherein the second digital communication services uses a different communication protocol from the first digital communication service.

11. A system for facilitating a safety check in emergency situations using a payment rail associated with a payment network, comprising:

an account database of a processing server configured to store a plurality of account profiles, wherein each account profile includes a structured data set related to a transaction account including at least a primary account number, account details, and one or more sets of communication data;

a receiving device of the processing server configured to receive a transaction message through the payment rail, wherein the transaction message is formatted based on one or more standards, includes an indication that an associated individual is safe, and includes a plurality of data elements including at least a first data element configured to store a specific primary account number;

a querying module of the processing server configured to execute a query on the account database to identify a specific account profile where the included primary account number corresponds to the specific primary account number stored in the corresponding data element included in the transaction message; and a transmitting device of the processing server configured to electronically transmit a notification including at least the account details stored in the identified specific account profile and indicating safety of the associated individual for at least one of the one or more sets of communication data stored in the identified specific account profile, wherein the notification is electronically transmitted via a digital communication service.

12. The system of claim 11, wherein the indication that the associated individual is safe is a message type indicator included in the transaction message indicative of a safety check.

13. The system of claim 11, wherein the indication that the associated individual is safe is stored in a second data element included in the transaction message configured for private use.

14. The system of claim 11, wherein the indication that the associated individual is safe is indicated via storage of a predetermined transaction amount in a second data element included in the transaction message.

15. The system of claim 11, wherein the digital communication service is a social network and the account details comprise at least an account identifier associated with the social network.

16. The system of claim 11, wherein the at least one of the one or more sets of communication data includes a telephone number, and the notification is included in a short messaging service message electronically transmitted to the telephone number using a short messaging service as the digital communication service.

17. The system of claim 11, wherein the receiving device of the processing server is further configured to receive a notification of an emergency condition, and the transmitting device of the processing server is further configured to electronically transmit a subsequent notification of the emergency condition to a computing device associated with the identified specific account profile.

18. The system of claim 17, wherein the subsequent notification is electronically transmitted to the computing device prior to receipt of the transaction message.

19. The system of claim 17, wherein the notification of the emergency condition includes at least an associated geographic area, the specific account profile further includes an associated geographic location, and the associated geographic location is included in the associated geographic area.

20. The system of claim 17, wherein the transmitting device of the processing server is further configured to electronically transmit a second notification indicating safety of the associated individual for at least a second of the one or more sets of communication data using a second digital communication service, and the second digital communication services uses a different communication protocol from the first digital communication service.

* * * * *